(12) United States Patent
Carr

(10) Patent No.: US 11,341,064 B2
(45) Date of Patent: May 24, 2022

(54) METHOD OF PROTECTING SENSITIVE DATA IN INTEGRATED CIRCUIT AND INTEGRATED CIRCUIT UTILIZING SAME

(71) Applicant: Realtek Singapore Private Limited, Singapore (SG)

(72) Inventor: Alan Maciel Carr, San Mateo, CA (US)

(73) Assignee: REALTEK SINGAPORE PRIVATE LIMITED, Singapore (SG)

( * ) Notice: Subject to any disclaimer, the term of this patent is extended or adjusted under 35 U.S.C. 154(b) by 53 days.

(21) Appl. No.: 16/705,195

(22) Filed: Dec. 5, 2019

(65) Prior Publication Data

US 2021/0173793 A1     Jun. 10, 2021

(51) Int. Cl.
*G06F 12/00* (2006.01)
*G06F 12/14* (2006.01)
*G06F 7/58* (2006.01)

(52) U.S. Cl.
CPC .......... *G06F 12/1416* (2013.01); *G06F 7/582* (2013.01); *G06F 12/14* (2013.01); *G06F 12/145* (2013.01); *G06F 12/1408* (2013.01); *G06F 12/1433* (2013.01); *G06F 12/1441* (2013.01); *G06F 12/1458* (2013.01); *G06F 12/1466* (2013.01); *G06F 12/1475* (2013.01); *G06F 12/1483* (2013.01); *G06F 12/1491* (2013.01); *G06F 2212/72* (2013.01)

(58) Field of Classification Search
CPC .. G06F 12/1416; G06F 7/582; G06F 2212/72; G06F 12/14; G06F 12/1408; G06F 12/1425; G06F 12/1433; G06F 12/1441; G06F 12/145; G06F 12/1458; G06F 12/1466; G06F 12/1475; G06F 12/1483; G06F 12/1491
See application file for complete search history.

(56) References Cited

U.S. PATENT DOCUMENTS

| | | | | |
|---|---|---|---|---|
| 4,870,346 | A * | 9/1989 | Mydill | G01R 31/31813 324/73.1 |
| 2004/0184609 | A1 | 9/2004 | Umeno | |
| 2006/0244544 | A1* | 11/2006 | Suzuki | G06F 7/588 331/57 |
| 2009/0160610 | A1* | 6/2009 | Doddamane | G06F 7/588 340/10.1 |
| 2013/0304781 | A1* | 11/2013 | Dey | G06F 7/584 708/254 |
| 2016/0197724 | A1* | 7/2016 | Nemiroff | H04L 9/0869 380/46 |

FOREIGN PATENT DOCUMENTS

| | | |
|---|---|---|
| CN | 101763239 A | 6/2010 |
| TW | 550457 B | 9/2003 |
| TW | 200811873 | 3/2008 |

* cited by examiner

*Primary Examiner* — Arvind Talukdar
(74) *Attorney, Agent, or Firm* — McClure, Qualey & Rodack, LLP

(57) ABSTRACT

A method of protecting a sensitive data sequence in an integrated circuit includes generating a pseudorandom sequence according to a seed sequence; combining the sensitive data sequence with the pseudorandom sequence to generate a protected data sequence; and storing the protected data sequence and the seed sequence. The sensitive data sequence is inaccessible from outside of the integrated circuit.

20 Claims, 4 Drawing Sheets

US 11,341,064 B2

METHOD OF PROTECTING SENSITIVE DATA IN INTEGRATED CIRCUIT AND INTEGRATED CIRCUIT UTILIZING SAME

BACKGROUND OF THE INVENTION

1. Field of the Invention

The invention relates to data security, and in particular, to a method of protecting sensitive data in an integrated circuit and an integrated circuit utilizing the same.

2. Description of the Prior Art

Modern electronic devices rely on cryptosystems to provide security for applications and associated data thereof. These cryptosystems are often targets of unauthorized attackers attempting to gain access to the applications or devices or attempting to collect sensitive information such as credit card numbers or cryptographic keys. A variety of tools and methods are available for extracting security information from electronic devices, including direct attacks targeting weaknesses of the cryptographic algorithms adopted by the cryptosystems, and side-channel attacks based on information gathered from the physical implementation of the cryptosystem. The side-channel attacks attempt to derive the sensitive information by measuring physical characteristics of the cryptosystem such as power consumption of the cryptosystems, or by optical inspections under high-resolution cameras or microscopes.

Power-monitoring attacks monitor the power consumption of the cryptosystems by measuring a current drawn from the device while performing cryptographic operations, and derive cryptographic operations or sensitive data from the amount of power consumed. A power attack can reveal a sequence of instructions being executed on a cryptosystem. Differential power analysis (DPA) attacks combine the power measurements of basic power-monitoring attacks with statistical analysis to extract information about cryptographic keys or other sensitive data being used during cryptographic operations. A statistical tool is used to correlate potential values with the power consumption measurements to derive the sensitive information.

Optical attacks use high-magnification devices such as a transmission electron microscope (TEM) to read and deduce cryptographic keys or other sensitive data.

SUMMARY OF THE INVENTION

According to one embodiment of the invention, an integrated circuit includes a seed register, a pseudorandom sequence generator, a combiner and a non-volatile memory. The seed register is used to store a seed sequence. The pseudorandom sequence generator is used to generate a pseudorandom sequence according to the seed sequence. The combiner is used to combine a sensitive data sequence with the pseudorandom sequence to generate a protected data sequence. The sensitive data sequence is inaccessible from outside of the integrated circuit. The non-volatile memory is used to store the protected data sequence.

According to another embodiment of the invention, an integrated circuit includes a seed register, a pseudorandom sequence generator, a combiner and a non-volatile memory. The seed register is used to store a seed sequence. The pseudorandom sequence generator is used to generate a pseudorandom sequence according to the seed sequence. The non-volatile memory is used to store a protected data sequence. The combiner is configured to combine the protected data sequence with the pseudorandom sequence to recover a sensitive data sequence. The sensitive data sequence is inaccessible from outside of the integrated circuit.

According to another embodiment of the invention, a method of protecting a sensitive data sequence in an integrated circuit includes generating a pseudorandom sequence according to a seed sequence; combining the sensitive data sequence with the pseudorandom sequence to generate a protected data sequence; and storing the protected data sequence and the seed sequence. The sensitive data sequence is inaccessible from outside of the integrated circuit.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
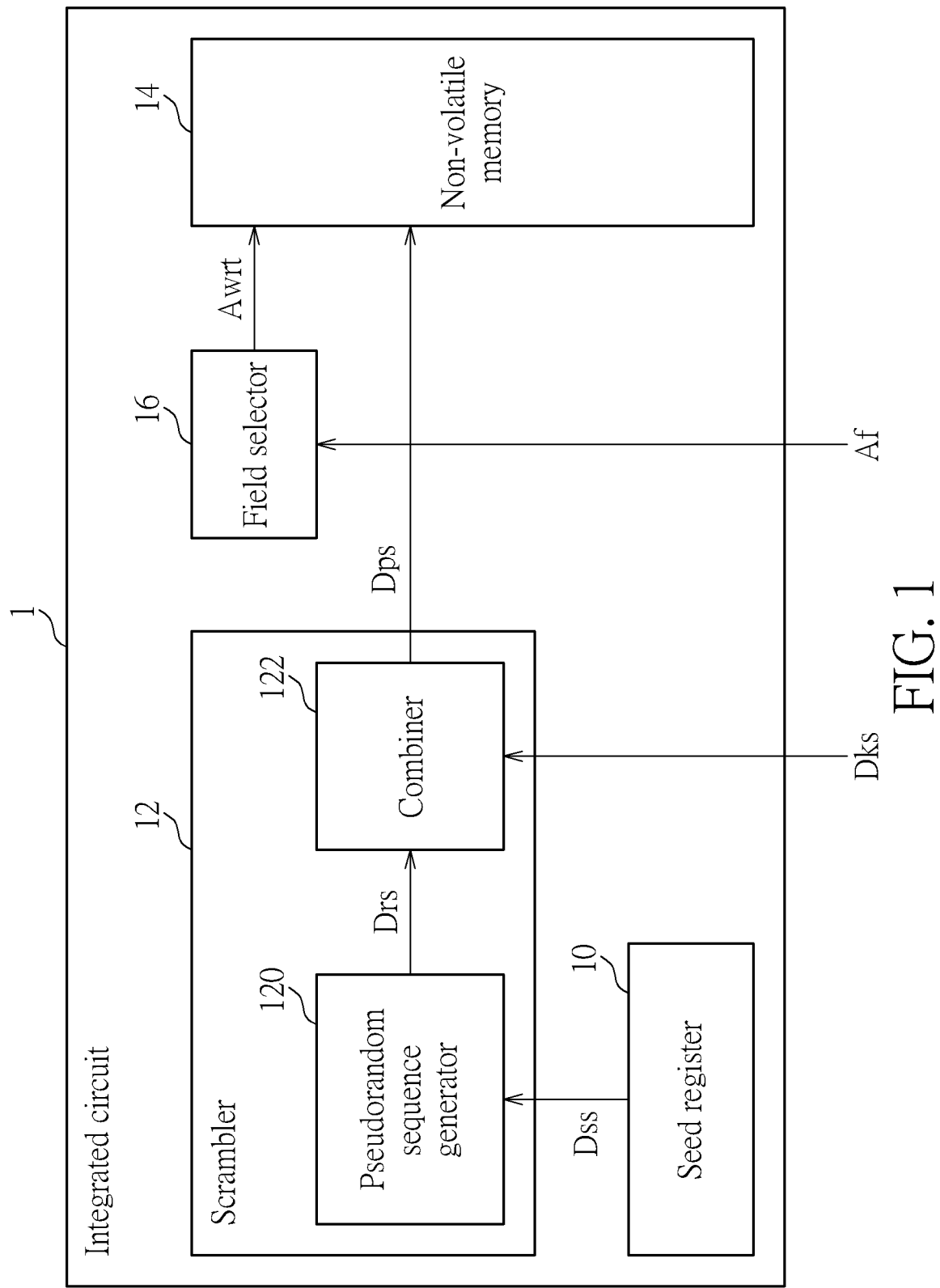
FIG. 1 is a block diagram of an integrated circuit according to an embodiment of the invention.

FIG. 1 is a block diagram of an integrated circuit 1 according to an embodiment of the invention. The integrated circuit 1 may be used in graphics processing, memory control, or other applications that intend to keep sensitive data such as a root key, a password or a credit card number private to the integrated circuit 1 without being accessed from outside of the integrated circuit 1. In the integrated circuit 1, the sensitive data is scrambled with a pseudorandom sequence prior to storage. In an optical side-channel attack, the attacker may only acquire the scrambled sensitive data but not the actual sensitive data. In a power-monitoring attack or a differential power analysis attack, power measurements of the scrambled sensitive data will produce substantially the same averaged power and substantially the same potential difference regardless of actual sequence variations of the sensitive data. Therefore, the scrambled sensitive data may serve to mitigate a differential power analysis attack and protect against visual extraction of the sensitive data in an optical attack.

The integrated circuit 1 may include a seed register 10, a scrambler 12, a non-volatile memory 14 and a field selector 16. The scrambler 12 may include a pseudorandom sequence generator 120 and a combiner 122. The scrambler 12 and the field selector 16 may be implemented by software, hardware, or a combination thereof. In the case of a software implementation, the scrambler 12 and the field selector 16 may be implemented by codes executable by a processor and stored in another non-volatile memory in the integrated circuit 1. In the case of a hardware implementation, the seed register 10 may be coupled to the scrambler 12, the scrambler 12 and the field selector 16 may be coupled to the non-volatile memory 14. The pseudorandom sequence generator 120 may be coupled between the seed register 10 and the combiner 122. The combiner 122 may be coupled to the non-volatile memory 14. The hardware implementation offers enhanced security to the sensitive data.

The seed register 10 may store a seed sequence Dss. The seed sequence Dss may be a binary sequence specific to the integrated circuit 1, and may be a unique user identifier (UUID) associated with a user of a device employing the integrated circuit 1, a unique device identifier (UDID) associated with the device employing the integrated circuit 1, or a unique bit sequence generated by a random number generator (RNG) during a manufacturing setup. The random number generator may be internal or external to the integrated circuit 1. The seed sequence Dss may be written into the seed register 10 in the manufacturing setup.

During the manufacturing setup, the scrambler 12 may receive a sensitive data sequence Dks, scramble the sensitive data sequence Dks using a pseudorandom sequence Drs to generate a protected data sequence Dps and write the protected data sequence Dps into the non-volatile memory 14. Specifically, the pseudorandom sequence generator 120 may generate the pseudorandom sequence Drs according to the seed sequence Dss, and the combiner 122 may combine the sensitive data sequence Dks with the pseudorandom sequence Drs in a bitwise manner to generate the protected data sequence Dps. The sensitive data sequence Dks, the pseudorandom sequence Drs and the protected data sequence Dps may be equal in length. The combiner 122 may contain exclusive-or (XOR) gates, exclusive-nor (XNOR) gates, and/or other gates for providing linear functions. The non-volatile memory 14 may be a one-time programmable (OTP) memory or an electrical fuse memory.

Figure 2:
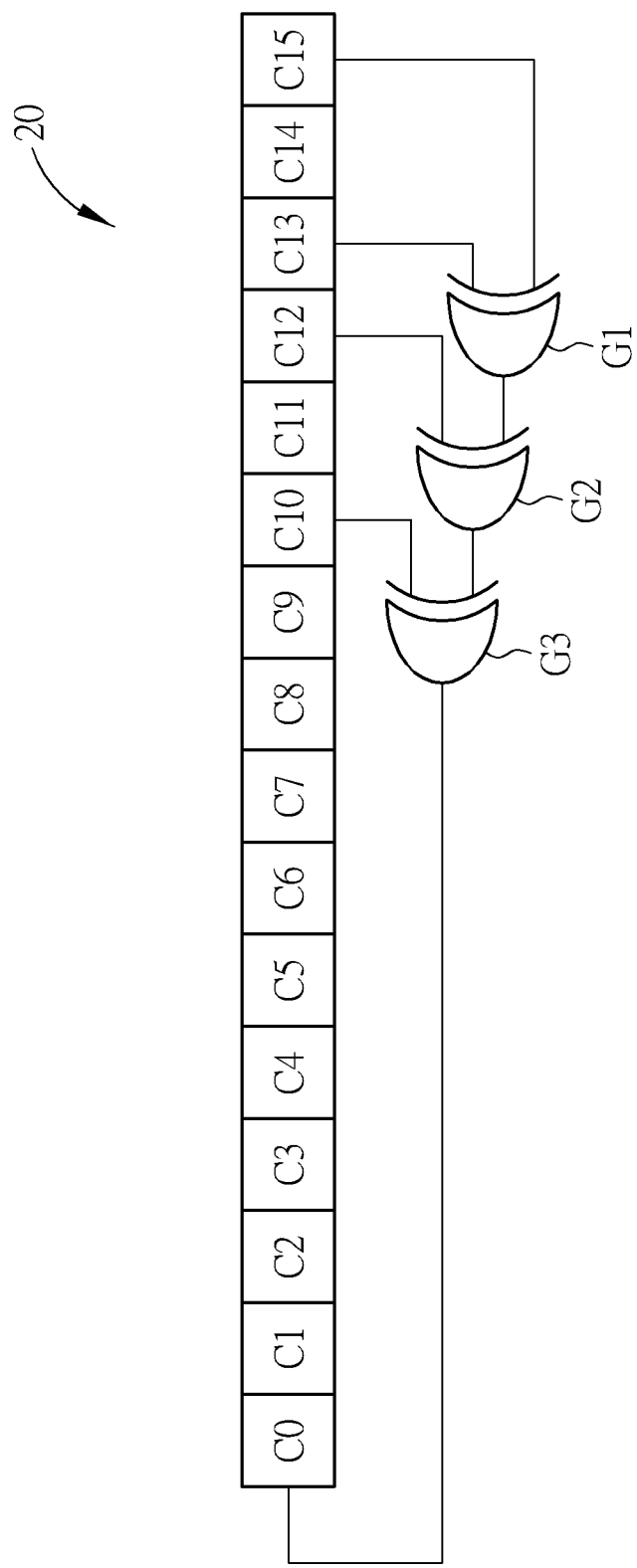
FIG. 2 shows a schematic diagram of an exemplary 16-bit LFSR.

The pseudorandom sequence generator 120 may comprise a linear feedback shift register (LFSR). The LFSR may comprise a shift register to propagate bits through cells of the shift register upon each clock cycle, typically, from one cell to the next higher-bit cell. The outputs from specific cells of the shift register, referred to as taps, may be fed back to the first cell of the shift register via one or more XOR gates, XNOR gates, and/or other gates that provide linear functions. The LFSR may have a characteristic polynomial defined by the locations of the taps, and a register length defined by a quantity of the cells in the shift register, e.g., 16 bits. The data length of the seed sequence Dss may be equal to the register length, e.g., 16 bits. The characteristic polynomial may be a finite field polynomial. The LFSR may load the seed sequence Dss as an initial value to generate the pseudorandom sequence Drs in a binary format. FIG. 2 shows a schematic diagram of an exemplary 16-bit LFSR 20 for use in the pseudorandom sequence generator 120. The LFSR 20 includes 16 cells C0 to C15 and XOR gates G1 to G3. The taps of the LFSR 20 are located at the $11^{th}$, the $13^{th}$, the $14^{th}$ and $16^{th}$ bits, and the characteristic polynomial of the LFSR 20 is $(1+x^{11}+x^{13}+x^{14}+x^{16})$. Initially, the cells C0 to C15 may load the seed sequence Dss to generate a bit of the pseudorandom sequence Drs at an output of the XOR gate G3, and feedback the generated bit to the cell C0 to generate the next bit of the pseudorandom sequence Drs. In this fashion, the LFSR 20 may sequentially generate the pseudorandom sequence Drs. In some embodiment, the characteristic polynomial may be specific to a product version of the integrated circuit 1, that is, a newer product version may have a characteristic polynomial different from a previous product version, enhancing data security for different product versions and preventing the sensitive data sequence Dks from being extracted.

The sensitive data sequence Dks may have a data length exceeding the register length of the LFSR 20. For example, the data length of the sensitive data sequence Dks may be 64 bits and the register length of the LFSR 20 may be 16 bits. If the sensitive data sequence Dks has a data length less than the register length of the LFSR 20, e.g., 8 bits, the scrambler 12 may insert padding bits after the sensitive data sequence Dks to ensure that the padded data sequence has a data length equal to the register length of the LFSR 20, e.g., 16 bits. If the sensitive data sequence Dks has a data length greater than but not a multiple of the register length of the LFSR 20, e.g., 24 bits, the scrambler 12 may insert padding bits after the sensitive data sequence Dks to ensure that the padded data sequence has a data length equal to a multiple of the register length of the LFSR 20, e.g., 32 bits. The insertion of the padding bits may be implemented by a software or hardware mechanism. The combiner 122 may combine the padded data sequence using the pseudorandom sequence Drs to generate the protected data sequence Dps. The combiner 122 may sequentially output the protected data sequence Dps in unit of the register length to the non-volatile memory 14 for storage.

The non-volatile memory 14 may be divided into a plurality of fields, and each field may be assigned a unique field address. Upon the combiner 122 receiving the sensitive data sequence Dks or the padded data sequence, the field selector 16 may receive an initial field address Af and employ the initial field address Af as a writing address Awrt to select a field of the non-volatile memory 14. The non-volatile memory 14 may store the protected data sequence Dps according to the writing address Awrt. If the data length of the protected data sequence Dps exceeds the register length of the LFSR 20, the field selector 16 may update the writing address Awrt according to the initial field address Af and the register length. In some embodiments, the field selector 16 may increment the writing address Awrt by the register length every predetermined period of time, e.g., incrementing the writing address Awrt by 16 bits every 16 clock cycles. In this manner, the non-volatile memory 14 may sequentially store the protected data sequence Dps in unit of the register length according to the writing address Awrt, and each protected data sequence Dps may be aligned with the register length of the LFSR 20.

The sensitive data sequence Dks may be scrambled to form the protected data sequence Dps prior to storage, protecting the sensitive data sequence Dks from being extracted using an optical attack.

Figure 3:
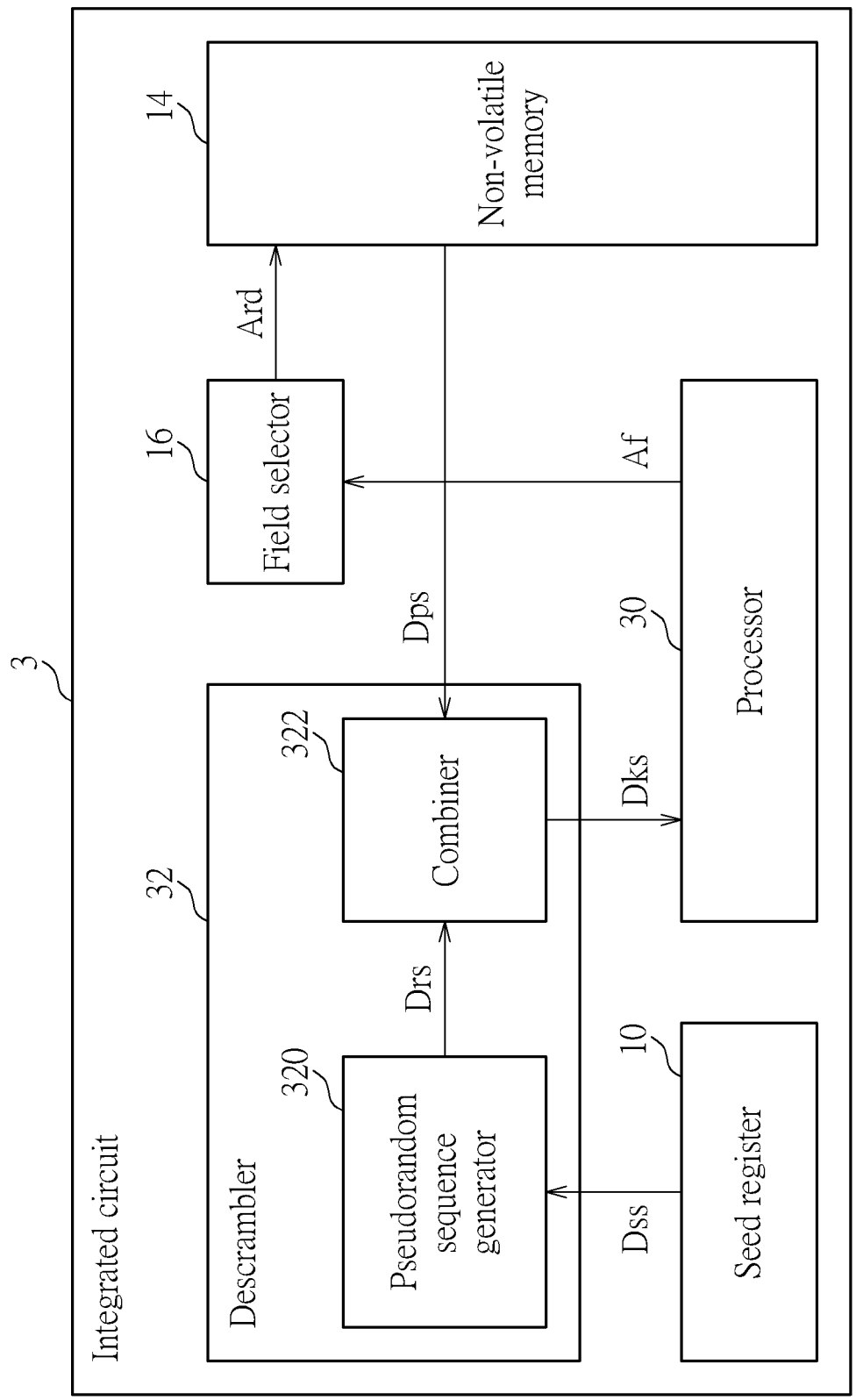
FIG. 3 is a block diagram of an integrated circuit according to another embodiment of the invention.

FIG. 3 is a block diagram of the integrated circuit 3 according to another embodiment of the invention. The integrated circuit 3 may descramble the protected data sequence Dps to recover the sensitive data sequence Dks. The integrated circuit 3 may include the seed register 10, a descrambler 32, the non-volatile memory 14, the field selector 16 and a processor 30, and may be integrated with the integrated circuit 1 to form one integrated circuit. The integrated circuit 3 is different from the integrated circuit 1 in the configurations and operations of the processor 30, the descrambler 32 and the field selector 16, explanation therefor will be provided as follows.

The descrambler 32 may be implemented by software, hardware, or a combination thereof. In the case of a software implementation, the descrambler 32 may be implemented by codes executable by the processor 30 and stored in another non-volatile memory in the integrated circuit 3. In the case of a hardware implementation, the processor 30 may be coupled to the descrambler 32 and the field selector 16, and the descrambler 32 and the field selector 16 are coupled to the non-volatile memory 14. The descrambler 32 may include a pseudorandom sequence generator 320 and a combiner 322. The pseudorandom sequence generator 320 and the combiner 322 may be configured and operated in a manner similar to the pseudorandom sequence generator 120 and the combiner 122 in FIG. 1, and the explanation therefor has been provided in the preceding paragraphs.

Upon power-on, the processor 30 may instruct the pseudorandom sequence generator 320 to load the seed sequence Dss from the seed register 10 to generate the pseudorandom sequence Drs, while sending an initial field address Af to the field selector 16 to generate a read address Ard to acquire the protected data sequence Dps from the non-volatile memory 14 according to the read address Ard. The combiner 322 may combine the protected data sequence Dps with the pseudorandom sequence Drs in a bitwise manner to recover the sensitive data sequence Dks, and direct the sensitive data sequence Dks to the processor 30. In turn, the processor 30 may cache the sensitive data sequence Dks in a protected internal memory for use in cryptographic operations, and discard the sensitive data sequence Dks from the protected internal memory upon completion of usage.

The field selector 16 may update the reading address Ard according to the initial field address Af and the register length. In some embodiments, the field selector 16 may increment the reading address Ard by the register length every predetermined period of time, e.g., incrementing the reading address Ard by 16 bits every 16 clock cycles. Therefore, a protected data sequence Dps having a data length exceeding the register length of the LFSR 20 may be acquired from the non-volatile memory 14.

The protected data sequence Dps may be descrambled to recover the sensitive data sequence Dks upon power-on, protecting the sensitive data sequence Dks from being extracted using a power-monitoring attack or a differential power analysis attack.

Figure 4:
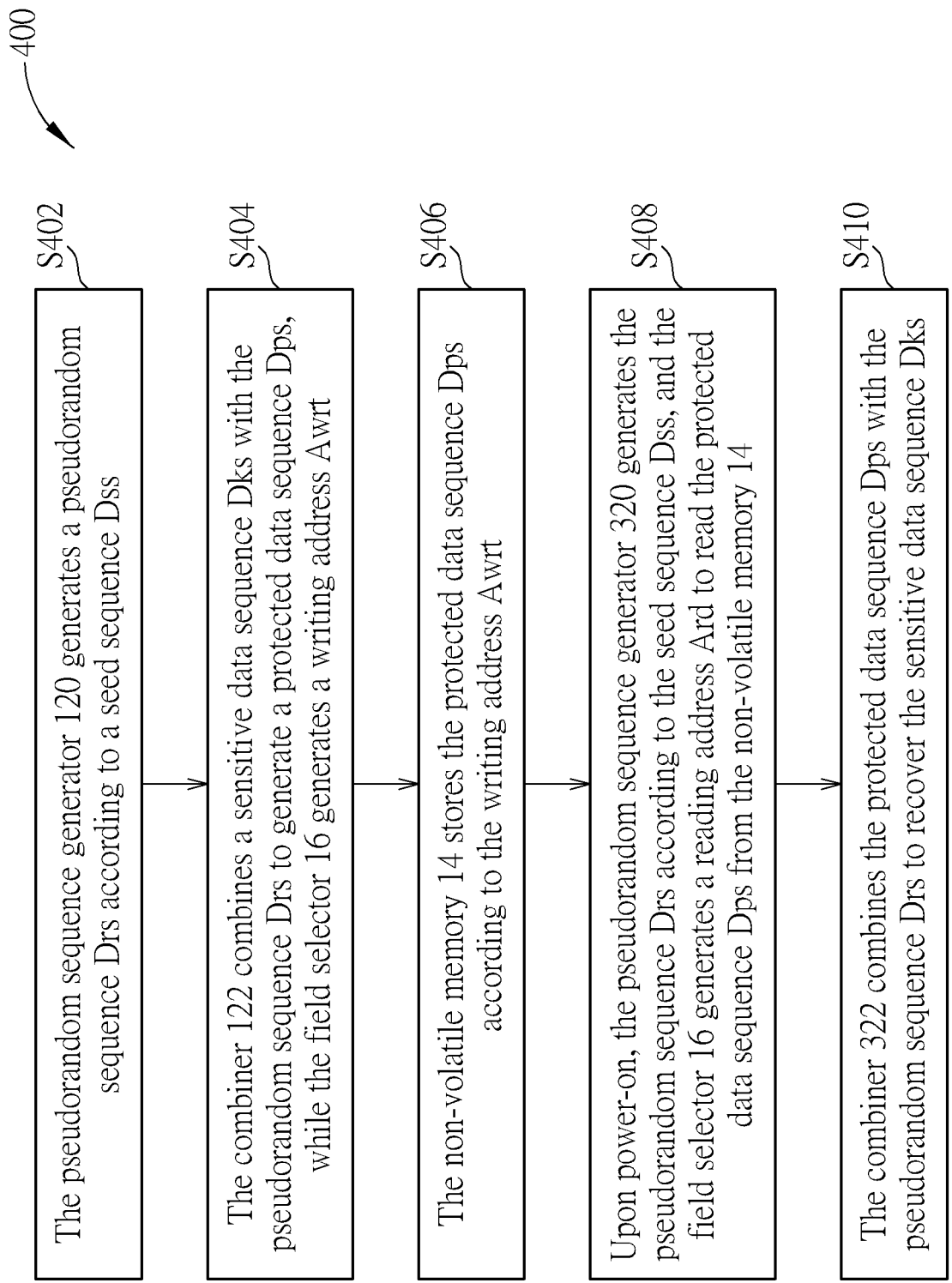
FIG. 4 is a flowchart of a method of protecting a sensitive data sequence in the integrated circuits in FIGS. 1, 3.

FIG. 4 is a flowchart of a method 400 of protecting the sensitive data sequence Dks in the integrated circuits 1, 3. The method 400 includes Steps S402 to S410, in which Steps S402 to S406 are used to scramble the sensitive data sequence Dks to produce the protected data sequence Dps for data storage, protecting the sensitive data sequence Dks against the optical side-channel attacks, and Steps S408 and S410 are used to descramble the protected data sequence Dps to recover the sensitive data sequence Dks for cryptographic operation usage, protecting the sensitive data sequence Dks against the power-monitoring attacks and the differential power analysis attacks. Any reasonable step change or adjustment is within the scope of the disclosure. Steps S402 to S410 are explained as follows:

Step S402: The pseudorandom sequence generator 120 generates a pseudorandom sequence Drs according to a seed sequence Dss;

Step S404: The combiner 122 combines a sensitive data sequence Dks with the pseudorandom sequence Drs to generate a protected data sequence Dps, while the field selector 16 generates a writing address Awrt;

Step S406: The non-volatile memory 14 stores the protected data sequence Dps according to the writing address Awrt;

Step S408: Upon power-on, the pseudorandom sequence generator 320 generates the pseudorandom sequence Drs according to the seed sequence Dss, and the field selector 16 generates a reading address Ard to read the protected data sequence Dps from the non-volatile memory 14;

Step S410: The combiner 322 combines the protected data sequence Dps with the pseudorandom sequence Drs to recover the sensitive data sequence Dks.

Details of Steps S402 to S410 have been provided in the preceding paragraphs and will be omitted here for brevity.

The method 400 may be adopted by integrated circuits 1, 3 to provide protections for sensitive data against the optical side-channel attacks, the power-monitoring attacks and the differential power analysis attacks.

The integrated circuits 1, 3 and the method 400 are employed to scramble sensitive data prior to storage and descramble protected data prior to usage, protecting the sensitive data against the optical side-channel attacks, the power-monitoring attacks and the differential power analysis attacks.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An integrated circuit comprising:
   a seed register configured to receive a fixed and unique seed sequence and store the unique seed sequence during a manufacturing setup, and configured to generate the unique seed sequence that has not been processed by the seed register, wherein the unique seed sequence corresponds to a specific device using the integrated circuit;
   a pseudorandom sequence generator comprising a linear feedback shift register coupled to the seed register and configured to receive the seed sequence from the seed register and generate a pseudorandom sequence according to the seed sequence;
   a combiner coupled to the pseudorandom sequence generator and configured to combine a sensitive data sequence with the pseudorandom sequence in a bitwise manner to generate a protected data sequence, the sensitive data sequence being inaccessible from outside of the integrated circuit, wherein the combiner comprises a plurality of logic gates, wherein each of the plurality of logic gates has a first input configured to receive a bit value from a bit position of the linear feedback shift register, and wherein each of the plurality of logic gates has a second input configured to receive either a bit value from a different bit position of the linear feedback shift register or from an output of another of the plurality of logic gates, and wherein one of the plurality of logic gates has an output coupled to an input end of the linear feedback shift register; and
   a non-volatile memory coupled to the combiner and configured to store the protected data sequence.

2. The integrated circuit of claim 1, wherein:
   the pseudorandom sequence generator configured to load the seed sequence to generate the pseudorandom sequence, and
   the plurality of logic gates of the combiner comprise exclusive-or (XOR) gates, exclusive-nor (XNOR) gates, or other gates configured to provide linear functions.

3. The integrated circuit of claim 1, further comprising:
   a field selector coupled to the pseudorandom sequence generator and configured to receive a field address and update a writing address according to the field address and a register length of the pseudorandom sequence generator;
   wherein the non-volatile memory is configured to store the protected data sequence according to the writing address.

4. The integrated circuit of claim 1, wherein the non-volatile memory is a one-time programmable memory.

5. The integrated circuit of claim 1, wherein the seed sequence is specific to the integrated circuit.

6. The integrated circuit of claim 1, wherein the pseudorandom sequence generator is associated with a characteristic polynomial specific to a product version of the integrated circuit.

7. An integrated circuit comprising:
a seed register configured to receive a fixed and unique seed sequence and store the unique seed sequence during a manufacturing setup, and configured to generate the unique seed sequence that has not been processed by the seed register, wherein the unique seed sequence corresponds to a specific device using the integrated circuit;
a pseudorandom sequence generator comprising a linear feedback shift register coupled to the seed register and configured to receive the seed sequence from the seed register and generate a pseudorandom sequence according to the seed sequence;
a non-volatile memory configured to store a protected data sequence; and
a combiner coupled to the pseudorandom sequence generator and the non-volatile memory and configured to combine the protected data sequence with the pseudorandom sequence in a bitwise manner to recover a sensitive data sequence, the sensitive data sequence being inaccessible from outside of the circuit, wherein the combiner comprises a plurality of logic gates, wherein each of the plurality of logic gates has a first input configured to receive a bit value from a bit position of the linear feedback shift register, and wherein each of the plurality of logic gates has a second input configured to receive either a bit value from a different bit position of the linear feedback shift register or from an output of another of the plurality of logic gates, and wherein one of the plurality of logic gates has an output coupled to an input end of the linear feedback shift register.

8. The integrated circuit of claim 7, wherein:
the pseudorandom sequence generator configured to load the seed sequence to generate the pseudorandom sequence, and
the plurality of logic gates of the combiner comprise exclusive-or (XOR) gates, exclusive-nor (XNOR) gates, or other gates configured to provide linear functions.

9. The integrated circuit of claim 7, further comprising:
a field selector coupled to the pseudorandom sequence generator and configured to receive a field address of the non-volatile memory and update a reading address according to the field address and a register length of the pseudorandom sequence generator.

10. The integrated circuit of claim 9, wherein the combiner is further configured to acquire the protected data sequence according to the reading address upon power-up of the integrated circuit.

11. The integrated circuit of claim 7, wherein the non-volatile memory is a one-time programmable memory.

12. The integrated circuit of claim 7, wherein the seed sequence is specific to the integrated circuit.

13. The integrated circuit of claim 7, wherein the pseudorandom sequence generator is associated with a characteristic polynomial specific to a product version of the integrated circuit.

14. A method of protecting a sensitive data sequence in an integrated circuit comprising:
receiving a fixed and unique seed sequence stored in a seed register during a manufacturing setup;
generating a unique seed sequence that has not been processed by the seed register, wherein the unique seed sequence corresponds to a specific device using the integrated circuit;
generating a pseudorandom sequence by a linear feedback shift register according to the seed sequence from the seed register;
combining the sensitive data sequence with the pseudorandom sequence in a bitwise manner to generate a protected data sequence, the sensitive data sequence being inaccessible from outside of the integrated circuit, wherein the combining operation utilizes a plurality of logic gates each having a first input configured to receive a bit value from a bit position of the linear feedback shift register and a second input configured to receive either a bit value from a different bit position of the linear feedback shift register or from an output of another of the plurality of logic gates, and wherein one of the plurality of logic gates has an output coupled to an input end of the linear feedback shift register, so as to define a characteristic polynomial for the linear feedback shift register; and
storing the protected data sequence and the seed sequence.

15. The method of claim 14, further comprising:
generating a writing address according to a field address and a length of the sensitive data sequence;
wherein storing the protected data sequence comprises storing protected data sequence in a non-volatile memory according to the writing address.

16. The method of claim 14, wherein the characteristic polynomial is specific to a product version of the integrated circuit.

17. The method of claim 14, further comprising:
combining the protected data sequence with the pseudorandom sequence to recover the sensitive data sequence.

18. The method of claim 14, wherein the seed sequence is specific to the integrated circuit.

19. The method of claim 14, wherein the seed sequence comprises at least one of a unique user identifier (UUID), a unique device identifier (UDID), and a unique bit sequence generated by a random number generator (RNG) during a manufacturing setup.

20. The method of claim 14, wherein data in the protected data sequence have substantially the same averaged power and the same potential difference.

* * * * *